(12) United States Patent
Shurgot et al.

(10) Patent No.: US 10,582,254 B2
(45) Date of Patent: Mar. 3, 2020

(54) FLEXIBLE EVENT RECORDING SYSTEM AND METHOD

(71) Applicant: AT&T Intellectual Property I, L.P., Atlanta, GA (US)

(72) Inventors: Mark Shurgot, Hollyglen, CA (US); Adam Mara, Stevenson Ranch, CA (US); Forrest Donald Miller, II, Culver City, CA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 5 days.

(21) Appl. No.: 15/910,481

(22) Filed: Mar. 2, 2018

(65) Prior Publication Data

US 2019/0273965 A1 Sep. 5, 2019

(51) Int. Cl.
| | |
|---|---|
| *H04N 21/43* | (2011.01) |
| *H04N 21/2187* | (2011.01) |
| *H04N 21/458* | (2011.01) |
| *H04N 21/433* | (2011.01) |
| *H04N 21/61* | (2011.01) |
| *H04N 21/4147* | (2011.01) |

(52) U.S. Cl.
CPC ..... *H04N 21/4334* (2013.01); *H04N 21/2187* (2013.01); *H04N 21/4147* (2013.01); *H04N 21/6143* (2013.01)

(58) Field of Classification Search
CPC ........... H04N 21/4334; H04N 21/2187; H04N 21/6143; H04N 21/4147
See application file for complete search history.

(56) References Cited

U.S. PATENT DOCUMENTS

| | | | |
|---|---|---|---|
| 7,835,522 B2 | 11/2010 | Kahn et al. | |
| 7,904,936 B2 | 3/2011 | Urdang et al. | |
| 8,176,516 B2 | 5/2012 | Krakirian et al. | |
| 8,312,504 B2 | 11/2012 | Carlucci et al. | |
| 8,385,723 B2 | 2/2013 | McClanahan et al. | |
| 8,661,463 B2 | 2/2014 | Lee et al. | |
| 9,167,196 B2 * | 10/2015 | Woods | H04N 5/76 |
| 9,307,278 B2 | 4/2016 | Ellis et al. | |
| 9,538,259 B1 | 1/2017 | Lam et al. | |
| 9,723,254 B2 | 8/2017 | Callaway et al. | |
| 2002/0054068 A1 * | 5/2002 | Ellis | H04N 5/44543 715/716 |

(Continued)

FOREIGN PATENT DOCUMENTS

| | | |
|---|---|---|
| CN | 104994378 A | 10/2015 |
| CN | 105376605 A | 3/2016 |

*Primary Examiner* — Brian T Pendleton
*Assistant Examiner* — Frank Johnson
(74) *Attorney, Agent, or Firm* — Guntin & Gust, PLC; Ralph Trementozzi

(57) ABSTRACT

Aspects of the subject disclosure may include, for example, receiving a request for recording a real-time media presentation of a live event accessible by way of a direct broadcast satellite service, wherein the request is associated with equipment of a subscriber of the direct broadcast satellite service. A source of the real-time media presentation is identified and monitored to determine whether the live event has ended. A termination is facilitated of the recording of the real-time media presentation of the live event by the equipment of the subscriber responsive to the determined end of the real-time media presentation of the live event. Other embodiments are disclosed.

20 Claims, 9 Drawing Sheets

(56) References Cited

U.S. PATENT DOCUMENTS

| | | | |
|---|---|---|---|
| 2004/0078817 A1* | 4/2004 | Horowitz | H04N 5/782 |
| | | | 725/58 |
| 2007/0058949 A1 | 3/2007 | Hamzy et al. | |
| 2007/0204298 A1 | 8/2007 | Shanks et al. | |
| 2007/0220543 A1 | 9/2007 | Shanks et al. | |
| 2008/0060005 A1 | 3/2008 | Shanks et al. | |
| 2008/0107392 A1* | 5/2008 | Grannan | H04N 5/445 |
| | | | 386/291 |
| 2008/0112686 A1 | 5/2008 | Chen et al. | |
| 2008/0307485 A1* | 12/2008 | Clement | H04N 5/76 |
| | | | 725/152 |
| 2010/0104257 A1* | 4/2010 | Broberg | H04N 5/76 |
| | | | 386/291 |
| 2011/0202687 A1* | 8/2011 | Glitsch | H04N 21/2407 |
| | | | 709/248 |
| 2012/0060194 A1 | 3/2012 | Alexander | |
| 2012/0183276 A1* | 7/2012 | Quan | H04N 5/782 |
| | | | 386/244 |
| 2012/0237182 A1* | 9/2012 | Eyer | H04N 5/783 |
| | | | 386/241 |
| 2013/0239136 A1* | 9/2013 | Babu | H04N 7/025 |
| | | | 725/32 |
| 2014/0289772 A1 | 9/2014 | Feldstein et al. | |
| 2015/0281778 A1 | 10/2015 | Xhafa et al. | |
| 2016/0219323 A1* | 7/2016 | Gordhan | H04N 21/435 |
| 2016/0255409 A1 | 9/2016 | Feldstein et al. | |
| 2016/0309227 A1* | 10/2016 | Casagrande | H04N 21/4622 |
| 2017/0078764 A1 | 3/2017 | Lam et al. | |
| 2017/0264956 A1 | 9/2017 | Gerhards et al. | |
| 2017/0272700 A1 | 9/2017 | Kahn et al. | |
| 2018/0007432 A1 | 1/2018 | Pontual et al. | |
| 2019/0124384 A1* | 4/2019 | Skowronski | H04N 21/26241 |

* cited by examiner

100

200

400

FLEXIBLE EVENT RECORDING SYSTEM AND METHOD

FIELD OF THE DISCLOSURE

The subject disclosure relates to a flexible event recording system and method.

BACKGROUND

Satellite television has become increasingly popular due to the wide variety of content and the quality of content available. A satellite television system typically includes a set top box that is used to receive the satellite signals and decode the satellite signals for use on a television. The set top box typically has a memory associated therewith. The memory may include a digital video recorder or the like as well as the operating code for the set top box.

Satellite television systems typically broadcast content to a number of users simultaneously in a system. Satellite television systems also offer subscription or pay-per-view access to broadcast content. Access is provided using signals broadcast over the satellite. Once access is provided the user can access the particular content. The broadcasting of a large selection of channels and pay-per-view programs uses a considerable amount of satellite resources. Such content may be received and stored by a digital video recorder (DVR) for later viewing. For example, a subscriber may choose to record a particular program according to a program line-up of a particular channel.

Sporting events and other live events may also be available to customers in a package. In some instances program start and/or stop times may be flexible. Namely, a particular start and/or stop time may depend on an outcome of a particular event, and/or progress of the event. For example, some sporting events, such as football, are played according to a game clock. The game clock, however, starts and stops according to a progression of the game, such that a stop time and/or duration of the game is likely indeterminable at the outset. Similarly, some events may include extra program segments, such as overtime in sporting events, which depends upon a progression of the game.

BRIEF DESCRIPTION OF THE DRAWINGS

Reference will now be made to the accompanying drawings, which are not necessarily drawn to scale, and wherein.

DETAILED DESCRIPTION

Figure 1:
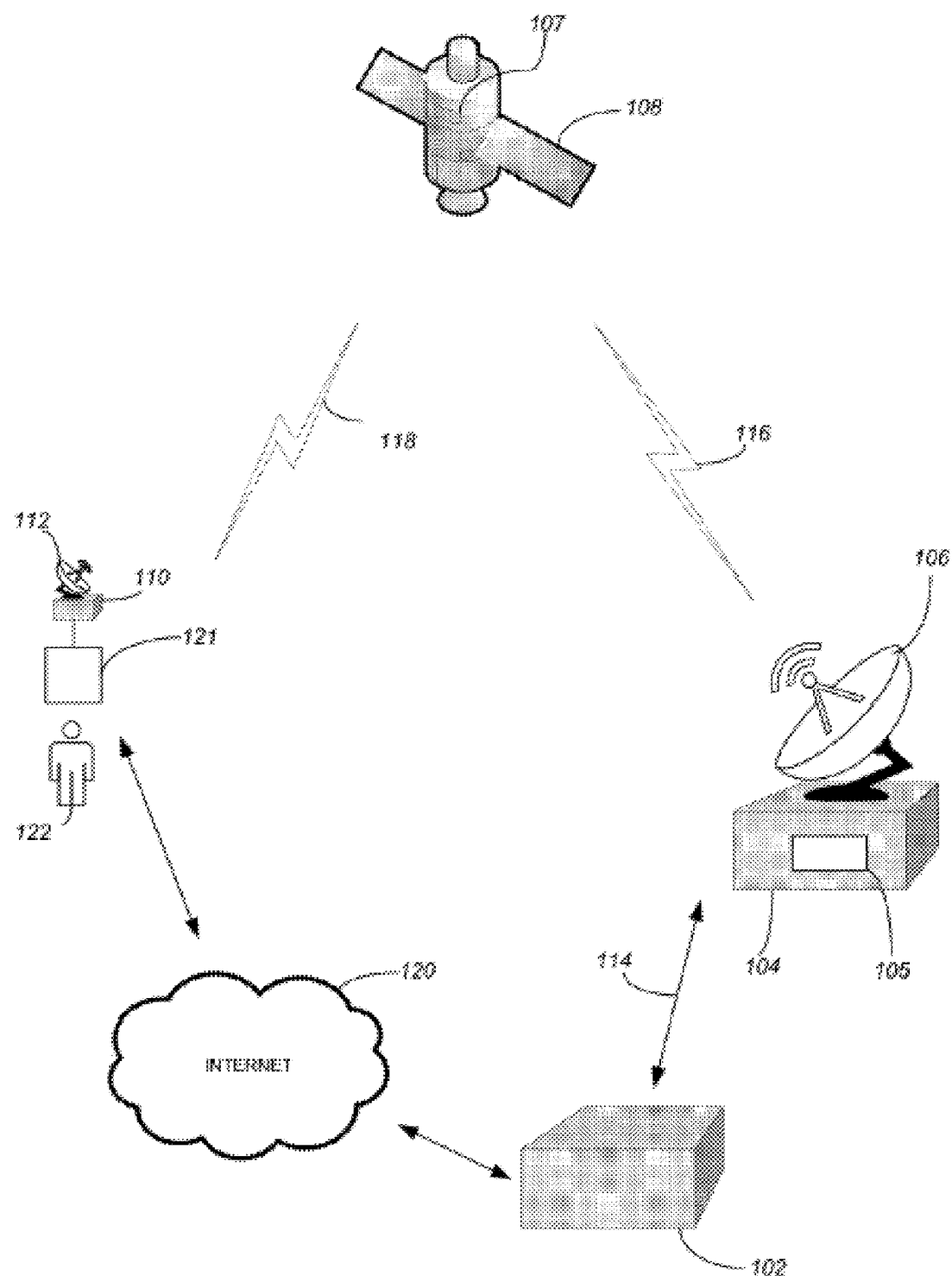
FIG. 1 depicts an illustrative embodiment of a distribution system that can be used to provide content data, control signaling, software updates and other data to subscriber equipment.

The subject disclosure describes, among other things, illustrative embodiments for initiating and/or terminating a recording of a media presentation of an event having a flexible start time and/or stop time that may not be available beforehand. Namely, the start and/or stop times may not be determinable before the actual start and/or stop of the event. Other embodiments are described in the subject disclosure.

One or more aspects of the subject disclosure include a device, including a processing system having a processor and a memory that stores executable instructions. The instructions, when executed by the processing system, facilitate performance of operations. The operations include receiving a request for recording a real-time media presentation of a live event accessible by way of a direct broadcast satellite service, wherein the request is associated with equipment of a subscriber of the direct broadcast satellite service. A source is identified of the real-time media presentation of the live event and a presentation status is monitored of the real-time media presentation of the live event according to the source. A determination is made, according to the monitoring of the presentation status, whether the presentation status indicates that the real-time media presentation of the live event has ended and a termination is facilitated of a recording of the real-time media presentation of the live event by the equipment of the subscriber, responsive to the determined end of the real-time media presentation of the live event.

One or more aspects of the subject disclosure include a non-transitory, machine-readable storage medium, including executable instructions that, when executed by a processing system including a processor, facilitate performance of operations. The operations include detecting a request for recording a real-time media presentation of a live event accessible by way of a direct broadcast satellite service. The request is associated with equipment of a subscriber of the direct broadcast satellite service. A source is determined of the real-time media presentation of the live event and an activity status is monitored of the live event according to the source. A determination is made according to the monitoring of the of the activity status, whether the activity status indicates that the live event has ended. A termination is facilitated of the recording of the real-time media presentation of the live event by the equipment of the subscriber, responsive to a determined end of the live event.

One or more aspects of the subject disclosure include a method that includes detecting, by a processing system including a processor, a request for recording a real-time media presentation of a live event accessible by way of a direct broadcast satellite service. The request is associated with equipment of a subscriber of the direct broadcast satellite service. A source is determined of the real-time media presentation of the live event and an activity status is monitored of the live event according to the source. A determination is made, according to the monitoring of the of the activity status, as to whether the activity status indicates that the live event has ended. A termination is facilitated of the recording of the real-time media presentation of the live event by the equipment of the subscriber, responsive to the determined end of the live event.

Viewers commonly record media programs for cataloging and/or later viewing. Storage is relatively inexpensive, allowing for entire programs, events, and/or channels to be recorded in their entirety. Bulk recording in this manner may ensure that a particular event of interest has been recorded, however, such bulk recording may limit capacity on particular DVR devices. Moreover, such bulk recording will likely burden a viewers of the recorded content by requiring them to search the recorded programs for particular events and/or sections of interest. Consider a subscriber that prefers to watch tennis matches that include a particular player or number of players. If an entire event, e.g., Wimbledon is recorded, there may be many matches for which the subscriber has little interest. For example, a subscriber may be interested in matches that include leading players, surging players, players ranked above a particular seed, specific individuals, e.g., Roger Federer, and so on.

The subject disclosure describes, among other things, illustrative embodiments for initiating and/or terminating a recording of a media presentation of an event having a flexible start time and/or stop time that may not be available beforehand. Namely, the start and/or stop times may not be determinable before the actual start and/or stop of the event.

FIG. 1 is a diagram illustrating an overview of a distribution system 100 that can be used to provide one or more of video data, audio data, software updates, and other data to subscribers. In at least some embodiments, the distribution system 100 can be used to facilitate recordings of media presentations of events that occur according to unpredictable start times, and/or unpredictable end times and/or unpredictable start and end times. The distribution system 100 comprises a control center 102 in communication with an uplink center 104 (together hereafter alternatively referred to as a headend) via a ground or other link 114 and with a subscriber receiver station 110 via the Internet 120, a public switched telephone network (PSTN) or other link. The control center 102, or headend provides program material, e.g., video programs, audio programs, software updates, and other data, to the uplink center 104 and coordinates with the subscriber receiver stations 110 to offer, for example, pay-per-view (PPV) program services, including billing and associated decryption of video programs.

The uplink center receives program material and program control information from the control center 102, and using an uplink antenna 106 and transmitter 105, transmits the program material and program control information to the satellite 108. The satellite 108 receives and processes this information, and transmits the video programs and control information to the subscriber receiver station 110 via downlink 118 using one or more transponders 107 or transmitters. The subscriber receiving station 110 comprises a receiver communicatively coupled to an outdoor unit (ODU) 112 and a display 121. The receiver processes the information received from the satellite 108 and provides the processed information to the display 121 for viewing by the subscriber 122. The ODU 112 may include a subscriber antenna and a low noise block converter (LNB).

In one embodiment, the subscriber receiving station antenna is an 18-inch slightly oval-shaped antenna. Standard definition transmissions are typically in the Ku band, while the high definition (HD) transmissions are typically in the Ka band. The slight oval shape is due to the 22.5 degree offset feed of the LNB which is used to receive signals reflected from the subscriber antenna. The offset feed positions the LNB out of the way so it does not block any surface area of the antenna minimizing attenuation of the incoming microwave signal.

In at least some instances, the distribution system 100 can include multiple satellites 108 to provide wider terrestrial coverage, to provide additional channels, and/or to provide additional bandwidth per channel. In at least some embodiments, each satellite comprises 16 transponders to receive and transmit program material and other control data from the uplink center 104 and provide it to the subscriber receiving stations 110. Using data compression and multiplexing techniques, two satellites 108 working together can receive and broadcast over 150 conventional (non-HDTV) audio and video channels via 32 transponders.

While embodiments of the invention disclosed herein will be described with reference to a satellite based distribution system 100, embodiments of the invention may also be practiced with terrestrial-based transmission of program information, whether by broadcasting means, cable, or other means. Further, the different functions collectively allocated among the control center 102 and the uplink center 104 as described above can be reallocated as desired without departing from the intended scope of embodiments of the present invention.

Although the foregoing has been described with respect to an embodiment in which the program material delivered to the subscriber 122 is video and/or audio program material such as a movie, the foregoing method can be used to deliver program material comprising purely audio information or other data as well. It is also used to deliver current receiver software and announcement schedules for the receiver to rendezvous to the appropriate downlink 118. Link 120 may be used to report the receiver's current software version.

A direct broadcast satellite set-top box 202 receives a digital input signal directly from a direct broadcast satellite dish. In some architectures and for certain programming, however, digital input signals may be received via other means: such as over-the-air terrestrial broadcasts, an multi-dwelling unit headend, another set-top box (e.g., a whole home DVR server), or broadband delivery via the Internet.

A standard definition set-top box may process MPEG2 video and MPEG1 layer 2 audio and support an electronic program guide as well as a conditional access security. In at least some embodiments, the set-top box support interactive applications as well.

A high definition set-top box additionally process high definition MPEG2 and MPEG4 AVC video/audio formats, as well as AC-3 audio. A high definition set-top box can support up to 1080p output resolution, and furthermore support 3D content using a frame compatible, e.g., side by side transmission format. One or more of the set-top boxes also have a home network connections, e.g., MoCA and/or Ethernet.

The set-top boxes equipped with DVR capabilities additionally provide for time-shifting of programming as well as pause and a number of rewind & fast-forward speeds.

Figure 2:
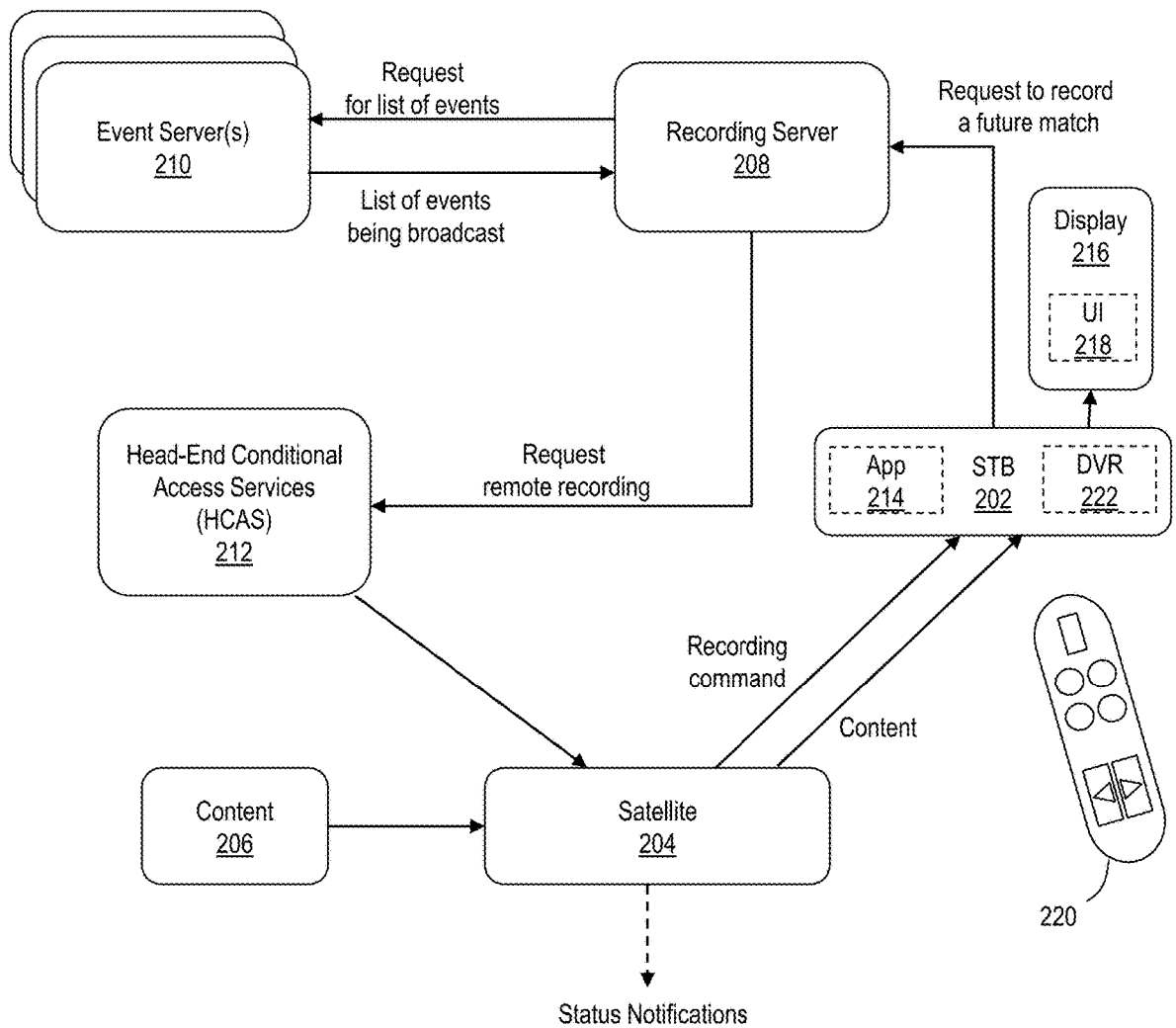
FIG. 2 depicts an illustrative embodiment of a flexible event recording system.

FIG. 2 depicts an illustrative embodiment of a flexible event recording system 200. In at least some embodiments, the flexible event recording system 200 can be used to facilitate recordings of media presentations of events that occur according to unpredictable start times, and/or unpredictable end times and/or unpredictable start and end times. The system includes one or more media processors, such as the example set-top box 202. The media processors generally represent equipment of a subscriber of network and/or media service. In at least some embodiments, the media processor 202 can include equipment of the network and/or media service provider and/or another third-party service provider. For example, the various flexible recording techniques disclosed herein can be implemented on end-user or subscriber equipment, such as home set-top boxes 202. Alternatively or in addition, the flexible recording techniques can be implemented on equipment of the network and/or media service provider and/or third party, e.g., recording events for subsequent viewing by subscribers. It is understood that such "choice" recordings may be provided to subscribers as an added service, e.g., according to subscription level, and/or according to PPV.

The illustrative media processor 202 is in communication with a display 216 device, such as a television, a monitor, a computer, a cell phone, a tablet device, a gaming console, and the like. It is understood that in at least some embodiments, the media processor 202 can be combined with a display 216 in a single device, such as a smart television, a computer, a cell phone, a tablet device, a gaming system, and the like.

The system 200 further includes a recording server 202 and one or more event servers 210. The recording server 208 receives request from equipment of a subscriber, such as the media processor 202, to record content, e.g., a media presentation of a particular event or class of events. The event servers 210, in turn, provide information related to content availability, content type, e.g., live content, sporting events, movies, news, and the like. Alternatively or in addition, one or more of the event servers 210 provide status indicators of the content as will be described more fully below. The recording server 208 is in communication between the media processor 202 and the one or more event servers 210. The system 200 further includes an access controller 212, such as the example head-end conditional access service system or processor. In the illustrative example, the access controller 212 is in communication with the recording server 208 and satellite services distribution equipment 204 of the direct broadcast satellite service provider.

The satellite services distribution equipment 204 can include one or more of a satellite link, a terrestrial link, such as a broadband link, a terrestrial radio link, a terrestrial broadcast link, a packet switched network, a circuit switched network, e.g., plain old telephone service (POTS), and combinations thereof. By way of example, the satellite services distribution equipment 204 can include one or more of the uplink center 104, the transmitter 105, the uplink antenna 106, the one or more transponders 107, the satellite 108, the control center 102 in communication with the uplink center 104, sometimes referred to as a headend, via a ground or other link 114 and with a subscriber receiver station 110 via one or more of the Internet 120, a public switched telephone network (PSTN) or other link.

In at least some embodiments, the subscriber equipment includes and/or otherwise accesses a flexible event recording application program 214. In at least some embodiments, the application program 214 provides a user interface 218. In the illustrative example, the user interface 218 can be displayed on a display device 216 in communication with the media processor 202. Alternatively or in addition, the user interface 218 can be displayed on one or more other devices, such as a smart phone, a tablet device, a laptop computer, a gaming console and so on.

It is further understood that in at least some embodiments, the system 200 includes at least one remote control device 220. The remote control device 220 can include a user interface, e.g., a physical interface including buttons and/or a soft interface, e.g., including a touch screen. The remote control device 220 can be used to control at least some aspects of the flexible event recording application program 214, e.g., making selections and/or entering commands, requests, supporting information, and the like, through the user interface 218. In some embodiments, the remote control device 220 includes one or more of a mobile phone, a tablet device, a laptop computer, a game console, a game controller, and the like.

By way of a non-limiting example, controls can include identification of a particular event, and/or a category of events to be recorded. Other controls can include additional features of an event, such as an approximate scheduled data and/or time, identification of one or more participants, identification of one or more details of the event, and so on. In at least some embodiments, controls can include user preferences, rules, e.g., logical applications of one or more details of an event, policies, subscription levels, costs, quality of service, network conditions, viewer reviews, and so on.

By way of further example, a user initiates a request for a flexible event recording using the user interface 218 by way of the remote controller 220. In some embodiments, the user interface 218 can be controlled according to a touchscreen, e.g., a touchscreen of the display device 216. In at least some embodiments, the application program 214 resident on the set-top box 202, initiates a forwarding of the request for flexible event recording from the set-top box 202 to the recording server 208. It is understood that communications between the set-top box 202 and the recording server 208 can include any of the various communication links disclosed herein, such as terrestrial broadband, dial-up service, PSTN, and the like. In at least some embodiments, the request for flexible event recording is based on hypertext transfer protocol, e.g., via the Internet.

The recording server 208, in response to receiving the request, identifies a source of the request, e.g., a requestor, or individual. Such identification can be accomplished according to any of various techniques, such as a network address of the set-top box 202, an equipment identification number, value or tag of the set-top box 202, an identification of a particular viewer, subscriber, and so on. Although the illustrative examples include a single set-top box 202, it is understood that the systems 100, 200, e.g., including the recording server 208, can service multiple request from the same and/or different media processors 202. For example, the recording server 208 can service flexible recording requests from different media processors 202 of the same business and/or household and/or different media processors 202 of multiple businesses and/or households. In at least some embodiments, multiple requests are received and tracked by the system 100, 200, e.g., the recording server 208, according to different viewers of the same household and in at least some instances, through the same set-top box 220. As flexible recording requests can be made well in advance, it is understood that one family member may request recording of an Olympic figure skating event, while another may request recordings of particular athletes of an Olympic snowboarding event, such as Shaun White.

It is envisioned that in at least some embodiments, the system 200 can provide status notifications related to the recording of the flexible event recording. An example is provided in which the satellite services distribution equipment 204 provides status notifications (shown in phantom). It is understood that notifications can be provided by one or more of the recording serer, the set-top box 202, the remote control 220, the access controller 212, a storage system, such as a cloud based DVR service provider, and the like.

Notices can include one or more of SMS text messages, voice calls/messages, emails, social media notifications, e.g., Tweets, and the like. Notices can address one or more of a status of a recording request, e.g., providing a subscriber, e.g., a child, and/or another entity, e.g., a parent, with an indication that a recording has been requested. The notice can include one or more details, such as a requesting subscriber, a requesting device, requested content, associated cost, a recording destination, and so on. It is understood that notices can also include status updates, such as an indication that an event has begun, and that recording has started. Likewise, the notices can indicate when an event has concluded and that recording has ended. In at least some applications, notices can include further details, such as progress updates of an event, e.g., scores, time remaining, weather conditions, penalties, delays, schedule changes, and so on. Alternatively or in addition, notices can include details on the recording, e.g., one or more of a time duration of the recording, a quality of the recording, a data size of the recording, a location of the recording, a total storage of the storage device, a remaining storage capacity of the storage device, and so on.

The recording server 208 identifies further details of the requested event from the received request. Details can include, without limitation, an event category, e.g., sports, news, entertainment, computer games. In at least some embodiments, the categories can be general. It is understood that further detail can be supplied in the request, such as participants, actors, etc. In some embodiments, the request can identify a particular event, such as a tennis match, e.g., the 2018 Australian Open. Further details of the request may identify a particular contestant, such as Roger Federer. In at least some embodiments, the request identifies a particular source of media programming of the event, such as a particular channel, content provider, and the like. In some embodiments, a flexible recording request for Olympic coverage of a particular event and/or a particular athlete, athletes, or team/country can be submitted as is, i.e., without identification of a particular source. In some embodiments, the flexible recording request for Olympic coverage may identify a source, such as NBC.

The recording server 208 identifies one or more event servers 210 based on the received request. The event servers 210 provide information indicative of an activity status, e.g., a progression of an event. In at least some embodiments, the event includes a live event, although, it is understood that the flexible recording techniques can be applied more broadly in at least some instances, e.g., according to re-broadcasts of previously recorded events, video on demand, and so on. The information can include text, metadata, observations, and the like.

In some embodiments, the information is obtained via descriptive audio provided for an event. Alternatively or in addition, the information is obtained by one or more of subtitles, textual translations, audio monitoring, e.g., using speech-to-text, speech recognition, image recognition, e.g., using facial recognition to identify individual participants in the events. In at least some embodiments, image and/or pattern recognition can be used to identify team participants, e.g., according to team colors and/or color combinations. Still further, event status can be obtained by monitoring activity and/or distinguish from periods of inactivity and so on, e.g., according to movement in a frame, color palate, and the like.

In at least some embodiments, the event servers 210 provide broadcast status of one or more events. Broadcast status can include a basic indication that the event is currently being broadcast alone or with further details, e.g., related to progression of the event. Such event progression details can include scores, time status, active participants, event details, e.g., whether a particular match is a semi-final or a final, and so on. It is understood that the broadcast status can be accessed generally, e.g., by a subscription and/or according to a news feed, a monitoring of an electronic program guide based on a current time and/or location, a channel, e.g., channel metadata and/or program metadata of content provided on the channel, and the like. Alternatively or in addition, the broadcast status can be accessed based on queries. In at least some embodiments, the recording server 208 can send a request to one or more event servers. In at least some embodiments, more than one request can be submitted. For example a request can be submitted periodically, e.g., according to a schedule. By way of further example, requests can be submitted according to a regular schedule, e.g., a predetermined number of second, minutes, hours, and the like. Alternatively or in addition, the requests and/or request frequency can be based on progression of the event. For example, if an NFL football game is in regular time, the requests can be submitted based on time remaining. However, if the game is in overtime, the requests can be submitted according to an accelerated schedule, as an end of the event is imminent. Alternatively or in addition, a request can be submitted responsive to an event, e.g., a triggering event. Without limitations, a triggering event can include a specific user request, a user presence information, e.g., including active user device(s), schedule, geolocation, network activity, preferences, historical compilations of one or more of the foregoing. In at least some embodiments, requests can be submitted according to configurable rules, e.g., including logical combinations of one or more of the foregoing examples.

It is envisioned further that in at least some embodiments, a monitoring of activity status, e.g., of a live event, can be performed in a substantially continuous manner. For example, an event status newsfeed and/or broadcast channel may be monitored for updates. Thus, updates may detected as they occur, without necessarily requiring submission of a request for status. When a status change is detected or otherwise determined according to such continuous monitoring, the processes and techniques disclosed herein can proceed as though determined in response to a request.

The periodic requests can be general, e.g., send status on all channels, events. Alternatively or in addition, the periodic requests can be based on particular events for which flexible recording requests have been received. For example, the recording server 208 can submit a request for a tennis match to an event server that tracks sports generally and/or the tennis match in particular.

The recording server 208 evaluates information obtained from the event servers 210 to determine an activity status of one or more events. Activity status can include, without limitation, a description of the event, progress information related to the event, participants in the event, a provider of content related to the event, whether a media presentation, e.g., a real-time media broadcast, pay-per-view, is available or otherwise active for the event. In at least some embodiments, the recording server 208 can further process information from the event servers 210 based on the one or more requests. By way of example, results of the processing can identify when a recording should begin for a particular requested flexible event recording request. Alternatively or in addition, results of the processing can identify when a recording of a particular requested event should be terminated.

Other factors can include application of logic and/or rules of one or more of the subscriber, the content provider and/or the media and/or network service provider. Logic can include, without limitation, halting recording early, e.g., before a requested event has terminated based on one or more of storage size, capacity of a DVR, quality of service, network activity, costs, permissions/authorizations, and so on. Similarly, recording can be initiated based on occurrence of an event, e.g., a score differential, e.g., recording an end portion of an event only if the score differential is relatively close. Alternatively, recoding can be terminated if scoring differential exceeds a threshold, i.e., a "blowout."

In at least some embodiments, the recording server 208 determines when recording equipment, e.g., a DVR of a media processor or set-top box 202, should be recording, paused, stopped, and in some instance powered on and/or powered off. Responsive to determination that a media recorder, e.g., DVR 222 of the set-top box 202 should initiate recording of a media presentation of a requested event, the recording server 208 facilitates provision of a "record" command to recording equipment of the requesting subscriber(s). Alternatively or in addition, responsive to a determination that the media recorder should end recording of a recording of a media presentation underway, the recording server 208 facilitates provision of a "stop recording" command to the recording equipment of the requesting subscriber(s). It is understood that the recording server 208 can monitor one or more event servers concurrently, as appropriate, to service flexible recording request from equipment of one or more subscribers.

In the illustrative example of a direct broadcast satellite service, the recording server 208 sends a request for remote recording to an access services processor 212, e.g., a head-end conditional access services processor 212 of the direct broadcast satellite service provider. The remote recording request identifies a recording device 222 and/or a particular subscriber account that may be associated with a predetermined list of recording equipment. The head-end conditional access services processor 212 initiates a recording control message directed to the subscriber recording equipment 222 and facilitates transport of the message through one or more portions of the satellite services distribution system 204. In some embodiments, the message is provided via a terrestrial link, such as a broadband link, a dial-up link, a terrestrial broadcast link, and the like.

The system 200 also includes a content source 206. The content source 206 can include a particular channel lineup, a video on demand server, a PPV server, a head-end server, a third party content server, and so on. In at least some embodiments, the content 206 can be delivered via the satellite services distribution system 204. It is understood that in at least some embodiments, the content and the recording commands are provided along a common communications link, e.g., via a satellite link, and/or via a broadband terrestrial link. Alternatively or in addition, the content and the recording commands re provided along different links, e.g., one provided via the satellite link, whereas the other is provided by a broadband, e.g., terrestrial link.

It is worth noting here that although the illustrative examples disclose direct broadcast satellite service, it is envisioned that the techniques disclosed herein can be applied more generally to any suitable media distribution system, including, without limitation, cable, fiber, PSTN or dial-up, etc.

Figure 3:
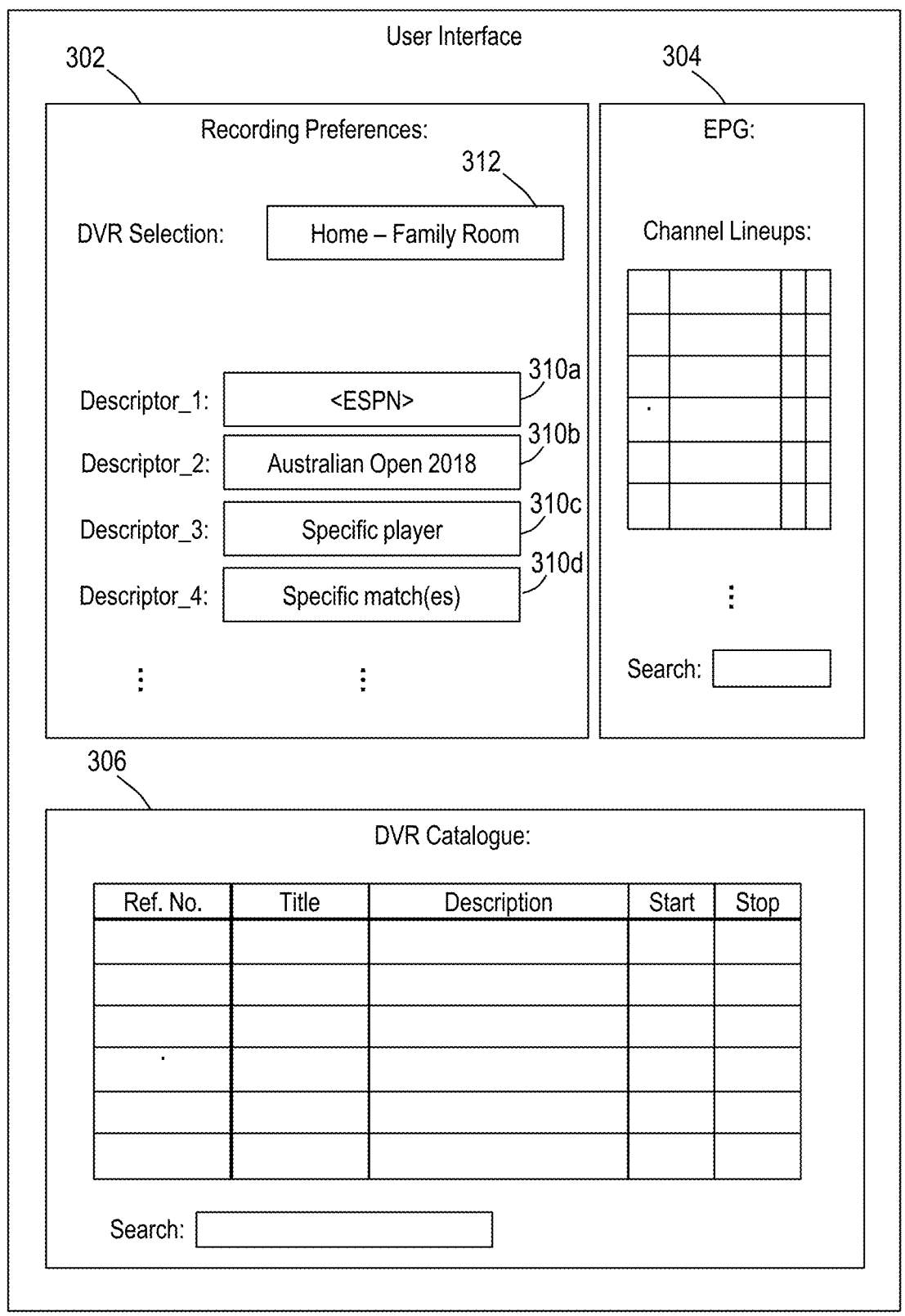
FIG. 3 depicts an illustrative embodiment of a flexible event recording user interface.

FIG. 3 depicts an illustrative embodiment of a flexible event recording user interface 300. In at least some embodiments, the flexible event recording user interface 200 can be integrated within a direct broadcast service user interface, e.g., an existing user interface of a DBS set-top box. The example user interface 300 includes a recording preferences section 203 adapted to accept user preferences related to a flexible recording request. In at least some embodiments, the user interface 300 includes an electronic program guide (EPG) section 304. Incorporation of the EPG 304 into the user interface 300 is not necessary, but can be helpful by allowing a subscriber to identify events of interest, content sources and/or channels and approximate scheduling times.

In at least some embodiments, the user interface 300 includes a DVR section 306. Incorporation of the DVR section 306 into the user interface 300 is not necessary, but can be helpful by allowing a subscriber to identify recording capacity, other recorded events, and so on.

The recording preferences section 302 can include one or more fields adapted to accept user selections and/or input. In the illustrative example, the recording preferences section 302 includes a DVR selection field 312. It is understood that many households have more than one set-top box and/or DVRs. Accordingly, the user interface 300 can be used to line up flexible recording events of one or more DVRs of the household.

In the illustrative example, the recording preferences section 302 includes a DVR selection field 312 includes multiple descriptor fields 310a, 310b, 310c, 310d, generally 310. The descriptor fields can accept descriptive information related to a flexible recording request, such as a request title, a source and/or category, an event title, a participant of interest, identification of other details related to the event. It is understood that any of the fields disclosed herein can include text entry boxes, pull-down menus, and/or be filled by voice activation, e.g., using a text to speech application.

It is further understood that in at least some embodiments, the user interface 300 can include fields and/or selectable features, buttons, switches, etc., to accept user rules for combining one or more of the recording preferences. For example, a rule might include initiating recording and/or terminating recording according to a combination of more than one of the descriptor fields 310. Alternatively or in addition, a ranking order can be identified, e.g., descriptor_3_310c having priority over descriptor_4_310d. For example, always record tennis matches with Roger Federer according to descriptor_3_310c, regardless of the importance of the match. Likewise, always record the semi-finals and/or finals regardless of the players. Alternatively, only record the match if it is a final match and if Roger Federer is a participant. The foregoing are provided as simple examples of how the fields 310 can be used alone or in combination.

Figure 4A:
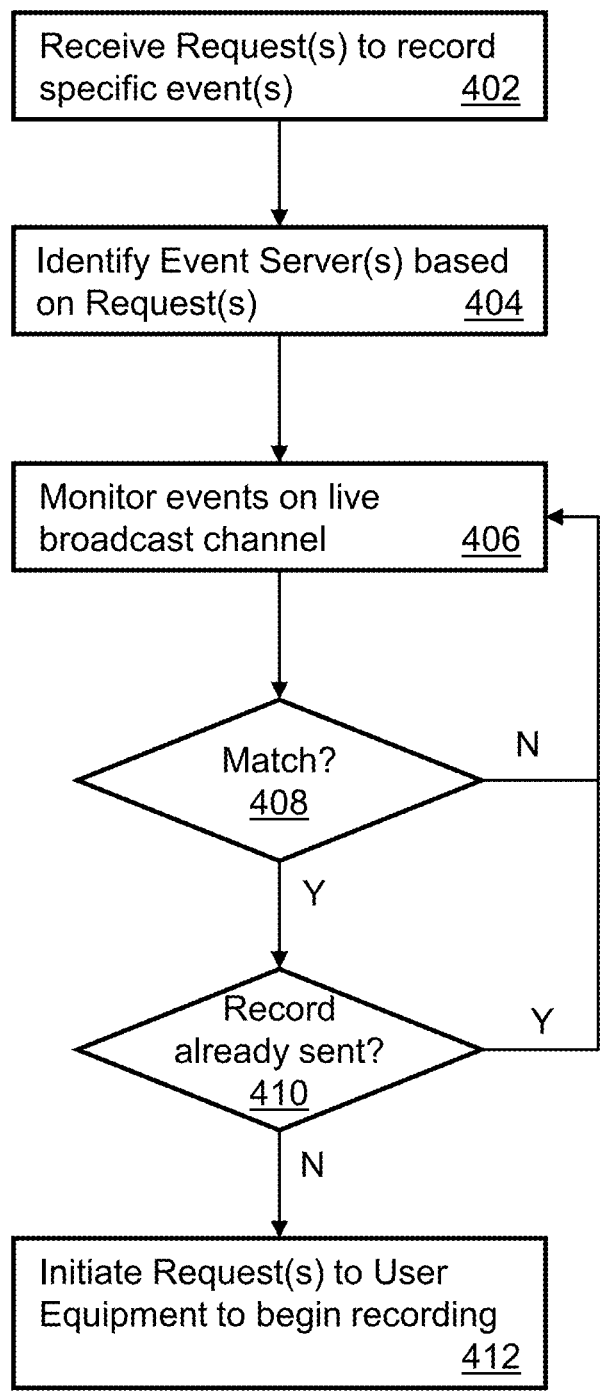
FIG. 4A-4B depicts illustrative embodiments of flexible event recording processes used in portions of the systems described in FIGS. 1-2.

FIG. 4A depicts an illustrative embodiment of a flexible event recording process 400 used in portions of the systems described in FIGS. 1-2. In particular, the process 400 is used to initiate flexible recording of a real-time presentation of a live event.

A request to record specific event is received at 402. For example, the request can be entered through the user interface 218 of the set-top box 202. The request can be forwarded to the recording server 208 for further processing.

An event server 210 is identified at 404 based on the request. For example, the event server 210 can be identified based on a default event server for the subscriber and/or the service provider. Alternatively or in addition, the event server 210 can be identified by the recording server 208 based on the request. For example, if the flexible recording request is related to sporting event, than an event server 210 that supports sporting content can be used. Alternatively or in addition, if the flexible recording request identifies a particular source, e.g., NBC, than an event server 210 that supports the identified content source is selected.

Status of real-time programming of live events are monitored at 406. In at least some embodiments, the monitoring can be accomplished using information obtained from the event server 210. For example, the event server 210 can provide event status of a live event provided on a particular broadcast channel. Status can indicate an event category, name, participants, progress, and the like.

A determination can be made at 408 as to whether there is a match between a monitored event and a request. For example, a match can be determined if one or more status indicators obtained from the event server 210 satisfy details of the request. For example, if the request is to record all matches of the 2018 Australian Open in which Roger Federer is playing, the status of players will be monitored. When the player status indicates Roger Federer is playing, a match is determined.

To the extent a match is not determined, the monitoring continues at 406. It is understood that the monitoring can include a continuous monitoring of a status feed, a periodic monitoring of a status feed, and/or a periodic monitoring based on queries to the event server 210.

To the extent a match is detected, a determination is made at 410 as to whether a record command has already been sent to the appropriate DVR associated with the flexible recording request. Continuing with the tennis example, if a tennis match of the Australian Open is being recorded because Roger Federer is playing, the monitoring can continue, e.g., periodically, without necessarily interrupting the ongoing recording of the requested event. However, if it is determined at 410 that the recording instruction has not been sent, a recording command is sent at 412. The recording command can be sent, e.g., from the conditional access system 212 as described herein.

Figure 4B:
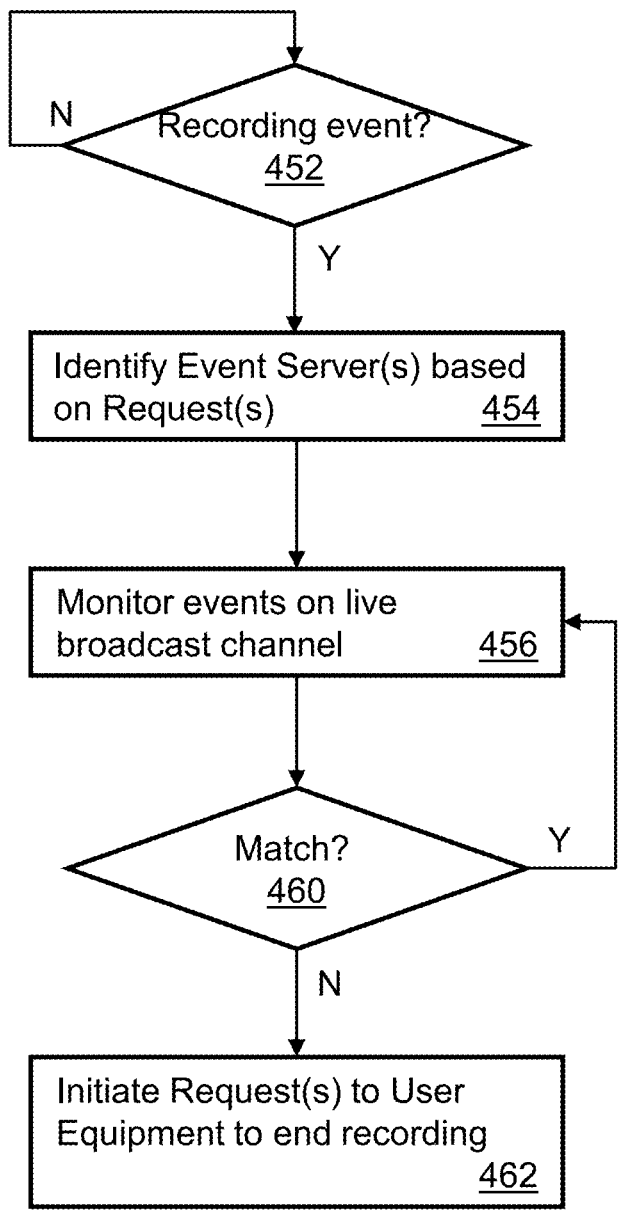

FIG. 4B depicts an illustrative embodiment of a flexible event recording process 450 used in portions of the systems described in FIGS. 1-2. In particular, the process 450 is used to terminate or otherwise end a flexible recording of a real-time presentation of a live event. A determination is made at 452 as to whether a flexible recording is ongoing. To the extent an event is not being recording, the determination is repeated at 452. For example, the monitoring can occur according to a schedule, e.g., a number of seconds, minutes. To the extent it is determined at 452 that an event is being recorded, the process 450 proceeds to identify an event server at 454 based on the request. It is understood that in at least some embodiments, the recording server 208 maintains a record of requests, requesting subscribers and/or devices, and a status of the recording, e.g., not begun, ongoing, terminated.

Status of real-time programming of live events are monitored at 456. In at least some embodiments, the monitoring can be accomplished using information obtained from the event server 210. For example, the event server 210 can provide event status of a live event provided on a particular broadcast channel. Status can indicate an event category, name, participants, progress, and the like.

A determination can be made at 408 as to whether there is a match between a monitored event and a request. For example, a match can be determined if one or more status indicators obtained from the event server 210 satisfy details of the request. For example, if the request is to record all matches of the 2018 Australian Open in which Roger Federer is playing, the status of players will be monitored. When the player status indicates Roger Federer is playing, a match is determined.

To the extent a match is determined, the monitoring continues at 456. It is understood that the monitoring can include a continuous monitoring of a status feed, a periodic monitoring of a status feed, and/or a periodic monitoring based on queries to the event server 210.

To the extent a match is not detected at 460, an end recording command is initiated at 462. It is understood that an event already being recorded can continue to be recorded as long as the details of the request are satisfied, e.g., Roger Federer is still playing. However, when the event is no longer satisfied, it can be concluded that the request to record is no longer satisfied. Accordingly, a request can be initiated to stop the user equipment, e.g., DVR 222, from recording.

Figure 5:
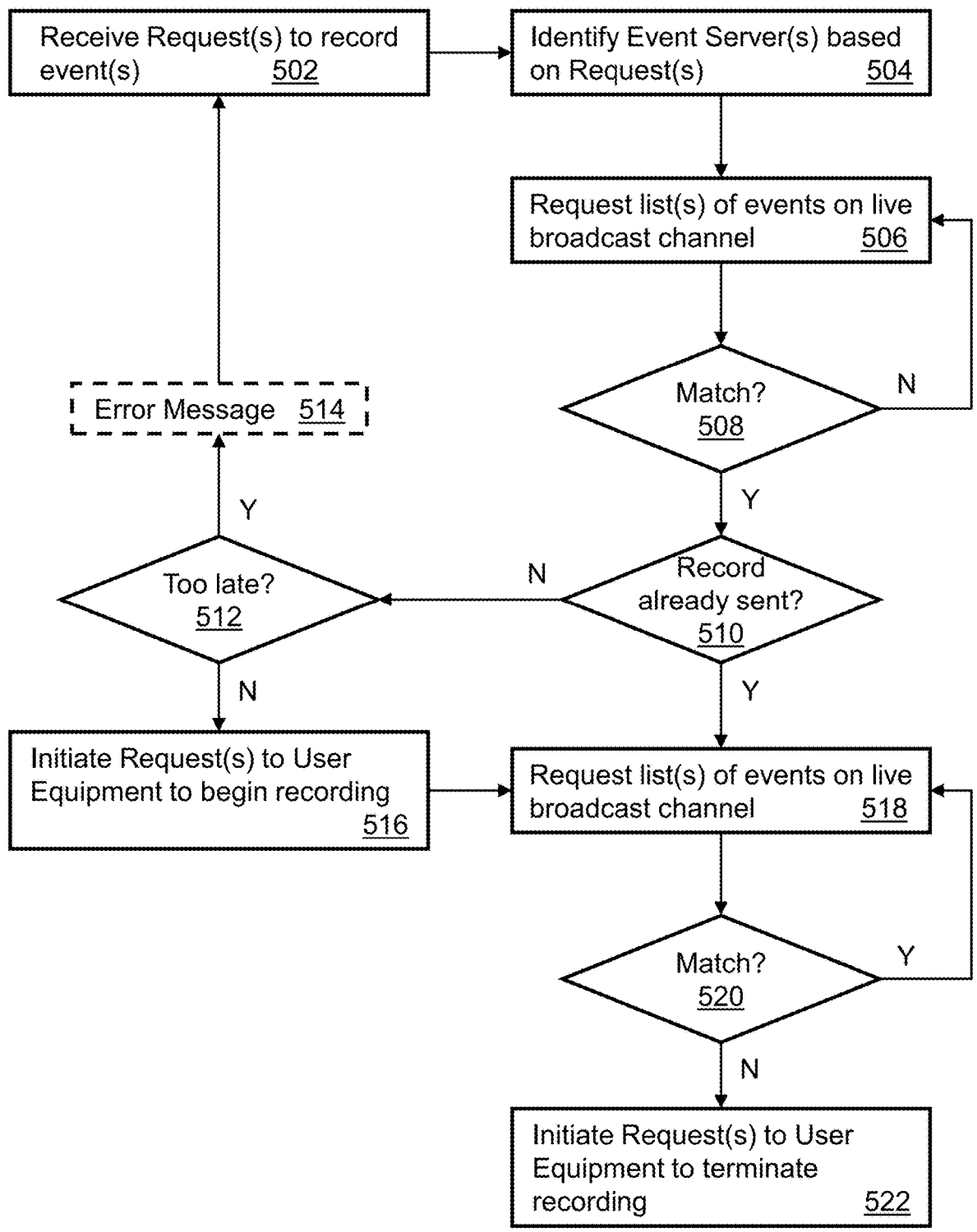
FIG. 5 depicts an illustrative embodiment of another flexible event recording process used in portions of the systems described in FIGS. 1-2.

FIG. 5 depicts an illustrative embodiment of another flexible event recording process 500 used in portions of the systems described in FIGS. 1-2. In particular, the process 500 facilitates both initiation of and termination of a flexible recording request.

A request to record an even is received at 502. The request can be received by the recording server 208, e.g., by way of the set-top box 202. It is worth noting here that although an application program 214 is disclosed as being resident on the set-top box 202, it is also possible to enter or otherwise submit a flexible recording request by other means, such as accessing a web site, e.g., a URL, according to a client-server architecture, voice activated, and so on.

The recording server 208 identifies one or more event servers 210 based on the received request at 504 according to any suitable technique, including the various techniques disclosed herein.

The recording server 208 requests information indicating live events available on real-time broadcast channel 506. A determination can be made at 508 as to whether there is a match between a monitored event and a request. To the extent a match is not detected, the recording server 208 submits a subsequent request for information indicative of live events available on the real-time broadcast channel at 506. The determination as to whether a match exists is repeated at 508.

To the extent a match is identified at 508, a further determination is made at 510 as to whether a recording instruction for the event was already issued at 510. To the extent that it is determined to be too late at 512, the process 500 can end or repeat, e.g., returning to receiving request(s) to record specific events at 502. In at least some embodiments, an error message can be generated at 514 (shown in phantom) to inform a requestor that it is too late, e.g., because the real-time presentation of the live event has already begun and/or ended. It is understood in at least some embodiments, a subscriber may be presented with an option to obtain a pre-recorded copy of the requested event, e.g., from a cloud recording service.

To the extent that it determined not to be too late at 512, a request(s) is initiated to facilitate a recording of the requested event by the equipment of the user at 516. The process 500 continues by requesting a list(s) of current events on live broadcast channel at 518. To the extent that it is determined at 510 that a request has already been sent, the process 500 continues by requesting a list(s) of current events on live broadcast channel at 518.

After requesting a list(s) of current events on live broadcast channel at 518, a determination is made at 520 as to whether a match exists. To the extent it is determined that a match exists, the process 500 repeats from 518, by requesting lists of current events on live broadcast channel. To it is determined at 520 that a match does not exist, Initiate Request(s) to User Equipment to terminate recording at 522.

While for purposes of simplicity of explanation, the respective processes are shown and described as a series of blocks in FIGS. 4-5, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

The flexible event recording system 100, 200 can include a combination of at least three different pieces of software that all work together to allow a customer to make a recording request for a sports event where the event's starting time and channel is not known. Primary components of this system are the sports specific event server 210, recording server 208, and the Head-End Conditional Access services 212.

In at least some embodiments, the recording server 208 takes HTTP requests from an interactive application on the set-top box 202 to record specific events and/or events that a particular player is playing in and stores the request. At a specified interval, the recording server 208 makes a request to the event server 210 to obtain a list of current events that are live on a broadcast channel. In at least some embodiments the request is a REST (Representational State Transfer) request. The REST request provides a simple manner of organizing interactions between independent systems.

The recording server 208 then reviews and/or analyzes its list of recording requests to match pending recording requests for descriptors, e.g., particular players, and events. If a pending request matches the live event and a request to record the event has not already been sent, the recording server 208 sends a request to the Head-End Conditional Access (HCAS) service 212. The HCAS service 212 then sends the command to the set-top box 202 to start recording on the specified channel for a given duration that was requested by the customer.

Currently, there is no way to stop a recording or extend it once it has started in order to make sure that the whole event is recorded if it were to go over an allotted time. The HCAS service 212 provides a means for direct communication to the set-top box 202. For the current system, an iTV app provides the customer with an option to extend the recording duration from a default duration. This duration value can be stored as part of the recording request to the recording server 208. The customer can change the duration value after a recording request is submitted, e.g., as long as the recording has not already started on a DVR of the set-top box 202.

Figure 6:
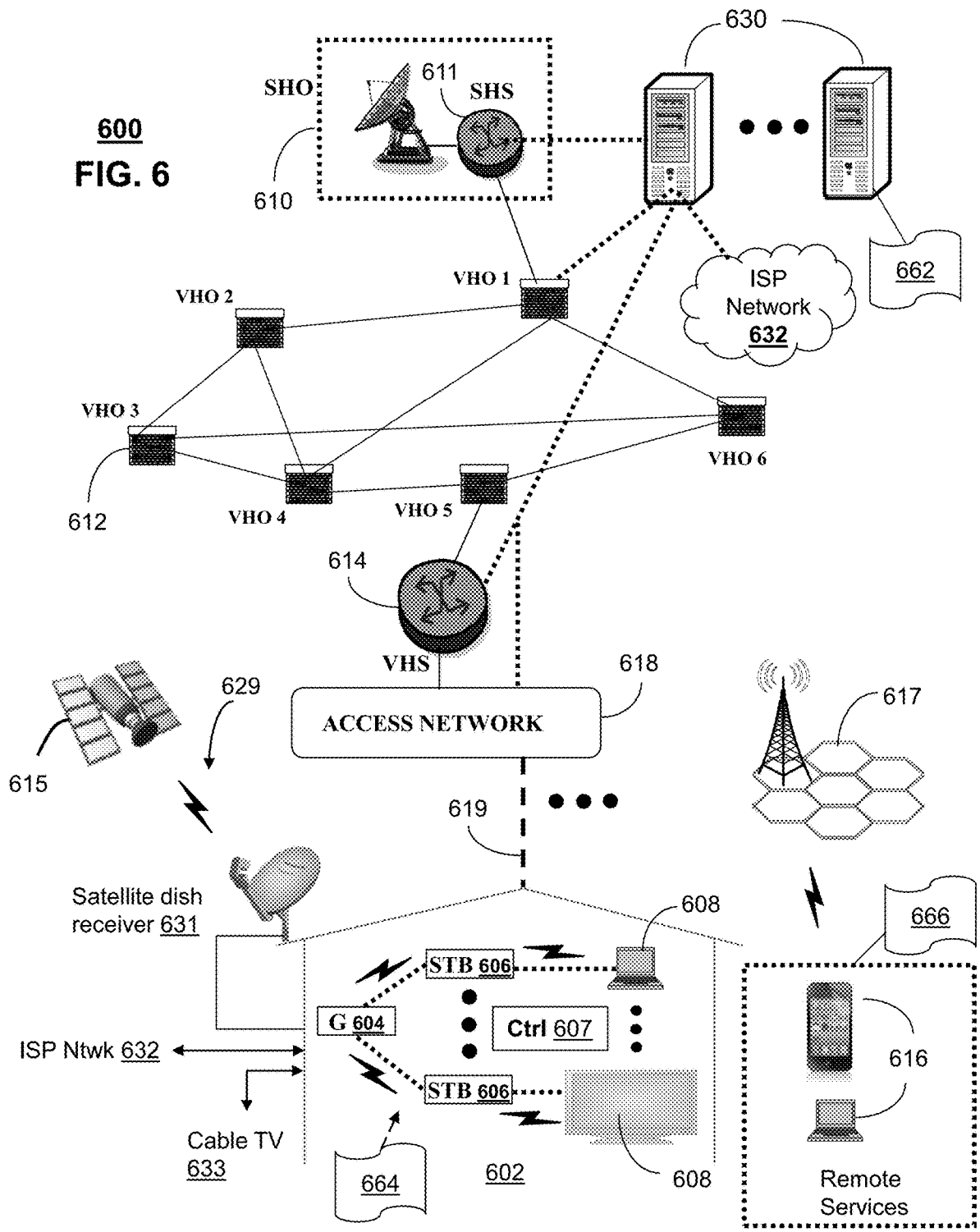
FIG. 6 depicts an illustrative embodiment of a communication system that provides media services used in the systems and processes of FIGS. 1-5.

FIG. 6 depicts an illustrative embodiment of a communication system 600 for providing various communication services, such as delivering media content. The communication system 600 can represent an interactive media network, such as an interactive television system (e.g., an Internet Protocol Television (IPTV) media system). Communication system 600 can be overlaid or operably coupled with one or more of the flexible recording systems 100, 200 of FIGS. 1-2, as another representative embodiment of communication system 600. For instance, one or more devices illustrated in the communication system 600 of FIG. 6, can be configured to receive a request for recording a real-time media presentation of a live event accessible by way of a direct broadcast satellite service, and/or to identify a source of the real-time media presentation, and/or to monitor the source periodically to determine whether the live event has ended. In at least some embodiments, one or more devices illustrated in the communication system 600 of FIG. 6 can be configured to facilitate termination of the recording of the real-time media presentation of the live event by the equipment of the subscriber responsive to the determined end of the real-time media presentation of the live event.

In one or more embodiments, the communication system 600 can include a super head-end office (SHO) 610 with at least one super headend office server (SHS) 611 which receives media content from satellite and/or terrestrial communication systems. In the present context, media content can represent, for example, audio content, moving image content such as 2D or 3D videos, video games, virtual reality content, still image content, and combinations thereof. The SHS server 611 can forward packets associated with the media content to one or more video head-end servers (VHS) 614 via a network of video head-end offices (VHO) 612 according to a multicast communication protocol. The VHS 614 can distribute multimedia broadcast content via an access network 618 to commercial and/or residential buildings 602 housing a gateway 604 (such as a residential or commercial gateway).

The access network 618 can represent a group of digital subscriber line access multiplexers (DSLAMs) located in a central office or a service area interface that provide broadband services over fiber optical links or copper twisted pairs 619 to buildings 602. The gateway 604 can use communication technology to distribute broadcast signals to media processors 606 such as Set-Top Boxes (STBs) which in turn present broadcast channels to media devices 608 such as computers or television sets managed in some instances by a media controller 607 (such as an infrared or RF remote controller).

The gateway 604, the media processors 606, and media devices 608 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 606 and subsystems of the IPTV media system for services such as video-on-demand (VoD), browsing an electronic programming guide (EPG), or other infrastructure services.

A satellite broadcast television system 629 can be used in the media system of FIG. 6. The satellite broadcast television system can be overlaid, operably coupled with, or replace the IPTV system as another representative embodiment of communication system 600. In this embodiment, signals transmitted by a satellite 615 that include media content can be received by a satellite dish receiver 631 coupled to the building 602. Modulated signals received by the satellite dish receiver 631 can be transferred to the media processors 606 for demodulating, decoding, encoding, and/or distributing broadcast channels to the media devices 608. The media processors 606 can be equipped with a broadband port to an Internet Service Provider (ISP) network 632 to enable interactive services such as VoD and EPG as described above.

In yet another embodiment, an analog or digital cable broadcast distribution system such as cable TV system 633 can be overlaid, operably coupled with, or replace the IPTV system and/or the satellite TV system as another representative embodiment of communication system 600. In this embodiment, the cable TV system 633 can also provide Internet, telephony, and interactive media services. System 600 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 630, a portion of which can operate as a web server for providing web portal services over the ISP network 632 to wireline media devices 608 and/or wireless communication devices 616.

Communication system 600 can also provide for all or a portion of the computing devices 630 to function as one or more of a recording server 208 (FIG. 2), an event server 210, and a head-end conditional access service 212 (herein referred to as flexible recording server 630). The flexible recording server 630 can use computing and communication technology to perform function 662, which can include among other things, the flexible recording techniques described by the processes 400, 450, 500 of FIGS. 4A, 4B, and 5. For instance, function 662 of server 630 can be similar to the functions described for one or more of a recording server 208, an event server 210, and a head-end conditional access service 212 of FIG. 2, in accordance with one or more of the processes 400, 450, 500 of FIGS. 4A, 4B, and 5. The media processors 606 and wireless communication devices 616 can be provisioned with software functions 664 and 666, respectively, to utilize the services of the flexible recording server 630. For instance, functions 664 and 666 of media processors 606 and wireless communication devices 616 can be similar to the functions described for the media processors 110, 121, and/or communication devices 202 of FIGS. 1-2 in accordance with one or more of the processes 400, 450, 500 of FIGS. 4A, 4B, and 5.

Multiple forms of media services can be offered to media devices over landline technologies such as those described above. Additionally, media services can be offered to media devices by way of a wireless access base station 617 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

It is further appreciated that wireless communication devices 616 of FIG. 6 can be communicatively coupled to the cellular base station 617, a femtocell, a WiFi router, a Digital Enhanced Cordless Telecommunications (DECT) base unit, or another suitable wireless access unit to establish communications with the communication system 600 of FIG. 6. The cellular access base station 617 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the wireline devices 608 and/or wireless communication devices 616 of FIG. 6.

In at least some embodiments, cellular phones supporting LTE can support packet-switched voice and packet-switched data communications and thus may operate as IMS-compliant mobile devices. In this embodiment, the cellular base station 617 may communicate directly with an IMS network, e.g., connecting the cellular base station 617 and a P-CSCF of the IMS network.

It is noted that terms such as DIAMETER commands are terms that can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 7:
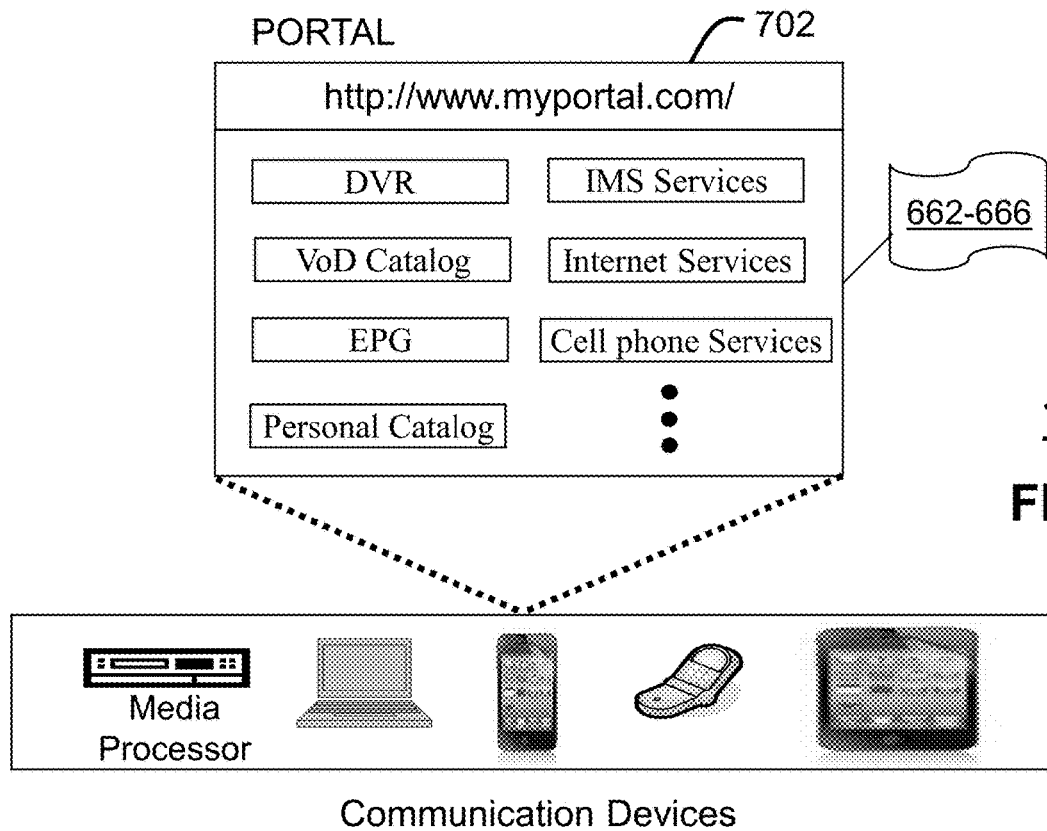
FIG. 7 depicts an illustrative embodiment of a web portal for interacting with the communication systems of FIGS. 1-3, and 6.

FIG. 7 depicts an illustrative embodiment of a web portal 702 of a communication system 700. Communication system 700 can be overlaid or operably coupled with one or more of the flexible recording systems 100, 200, 300 of FIGS. 1, 2 and/or 3, and/or communication system 600 of FIG. 6, as another representative embodiment of flexible recording systems 100, 200, 300 of FIGS. 1, 2 and/or 3, and/or communication system 600. The web portal 702 can be used for managing services of the flexible recording systems 100, 200, 300 of FIGS. 1, 2 and/or 3 and/or for managing the communication system 600. A web page of the web portal 702 can be accessed by a Uniform Resource Locator (URL) with an Internet browser using an Internet-capable communication device such as those described in FIGS. 1, 2 and/or 3 and FIG. 6. The web portal 702 can be configured, for example, to access a media processor 606 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 606. The web portal 702 can also be used for provisioning IMS services described earlier, provisioning Internet services, provisioning cellular phone services, and so on.

The web portal 702 can further be utilized to manage and provision software applications 662-666 to adapt these applications as may be desired by subscribers and/or service providers of the flexible recording systems 100, 200 and/or 300 of FIGS. 1, 2 and/or 3, and communication systems 600. For instance, users of the services provided by one or more of the recording server 208, the event server(s) 210, the head-end conditional access services 212, the satellite services distribution system 204 and/or the flexible recording server 630 can log into their on-line accounts and provision the services and/or servers or equipment 204, 208, 210, 212 and/or server 630 with request for recording one or more events, such as live events that may be subject to unpredictable start and/or stop times. Alternatively or in addition, a user may want to program such as user profiles, subscription updates, authorization information, preferences, such as channels, content sources, quality, presentation/display platforms, provide contact information to server to enable it to communication with devices described in FIGS. 1-6, and so on. Service providers can log onto an administrator account to provision, monitor and/or maintain one or more of the control center 102, the uplink center 104, the services and/or servers or equipment 204, 208, 210, 212 of FIGS. 1-2 and/or the flexible recording server 630 of FIG. 6.

Figure 8:
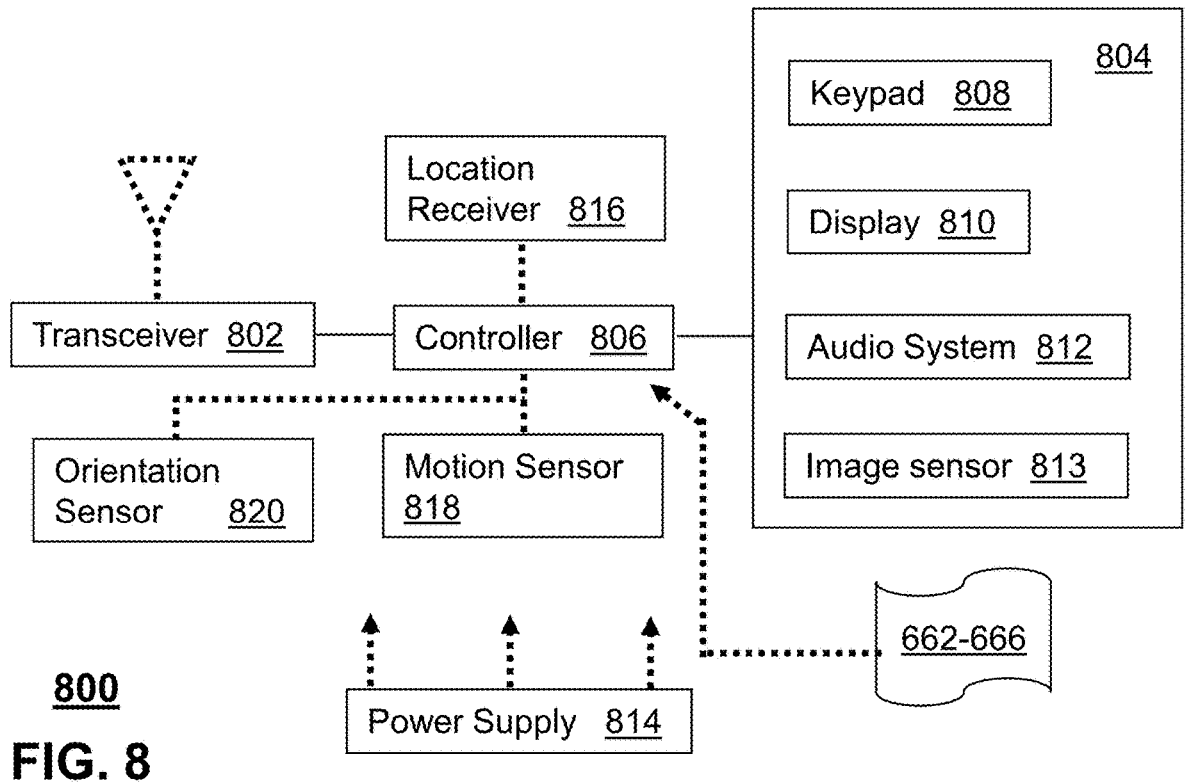
FIG. 8 depicts an illustrative embodiment of a communication device usable with the communication systems of FIGS. 1-3, and 6.

FIG. 8 depicts an illustrative embodiment of a communication device 800. Communication device 800 can serve in whole or in part as an illustrative embodiment of one or more of the devices depicted in FIGS. 1, 2 and/or FIG. 6 and can be configured to perform portions of one or more of the processes 300, 400, 450 of FIGS. 3, 4A and 4B.

Communication device 800 can comprise a wireline and/or wireless transceiver 802 (herein transceiver 802), a user interface (UI) 804, a power supply 814, a location receiver 816, a motion sensor 818, an orientation sensor 820, and a controller 806 for managing operations thereof. The transceiver 802 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 802 can also be adapted to support circuit-switched wireline access technologies (such as PSTN), packet-switched wireline access technologies (such as TCP/IP, VoIP, etc.), and combinations thereof.

The UI 804 can include a depressible or touch-sensitive keypad 808 with a navigation mechanism such as a roller ball, a joystick, a mouse, or a navigation disk for manipulating operations of the communication device 800. The keypad 808 can be an integral part of a housing assembly of the communication device 800 or an independent device operably coupled thereto by a tethered wireline interface (such as a USB cable) or a wireless interface supporting for example Bluetooth®. The keypad 808 can represent a numeric keypad commonly used by phones, and/or a QWERTY keypad with alphanumeric keys. The UI 804 can further include a display 810 such as monochrome or color LCD (Liquid Crystal Display), OLED (Organic Light Emitting Diode) or other suitable display technology for conveying images to an end user of the communication device 800. In an embodiment where the display 810 is touch-sensitive, a portion or all of the keypad 808 can be presented by way of the display 810 with navigation features.

The display 810 can use touch screen technology to also serve as a user interface for detecting user input. As a touch screen display, the communication device 800 can be adapted to present a user interface with graphical user interface (GUI) elements that can be selected by a user with a touch of a finger. The touch screen display 810 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 810 can be an integral part of the housing assembly of the communication device 800 or an independent device communicatively coupled thereto by a tethered wireline interface (such as a cable) or a wireless interface.

The UI 804 can also include an audio system 812 that utilizes audio technology for conveying low volume audio (such as audio heard in proximity of a human ear) and high volume audio (such as speakerphone for hands free operation). The audio system 812 can further include a microphone for receiving audible signals of an end user. The audio system 812 can also be used for voice recognition applications. The UI 804 can further include an image sensor 813 such as a charged coupled device (CCD) camera for capturing still or moving images.

The power supply 814 can utilize common power management technologies such as replaceable and rechargeable batteries, supply regulation technologies, and/or charging system technologies for supplying energy to the components of the communication device 800 to facilitate long-range or short-range portable applications. Alternatively, or in combination, the charging system can utilize external power sources such as DC power supplied over a physical interface such as a USB port or other suitable tethering technologies.

The location receiver 816 can utilize location technology such as a global positioning system (GPS) receiver capable of assisted GPS for identifying a location of the communication device 800 based on signals generated by a constellation of GPS satellites, which can be used for facilitating location services such as navigation. The motion sensor 818 can utilize motion sensing technology such as an accelerometer, a gyroscope, or other suitable motion sensing technology to detect motion of the communication device 800 in three-dimensional space. The orientation sensor 820 can utilize orientation sensing technology such as a magnetometer to detect the orientation of the communication device 800 (north, south, west, and east, as well as combined orientations in degrees, minutes, or other suitable orientation metrics).

The communication device 800 can use the transceiver 802 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 806 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 800.

Other components not shown in FIG. 8 can be used in one or more embodiments of the subject disclosure. For instance, the communication device 800 can include a reset button (not shown). The reset button can be used to reset the controller 806 of the communication device 800. In yet another embodiment, the communication device 800 can also include a factory default setting button positioned, for example, below a small hole in a housing assembly of the communication device 800 to force the communication device 800 to re-establish factory settings. In this embodiment, a user can use a protruding object such as a pen or paper clip tip to reach into the hole and depress the default setting button. The communication device 800 can also include a slot for adding or removing an identity module such as a Subscriber Identity Module (SIM) card. SIM cards can be used for identifying subscriber services, executing programs, storing subscriber data, and so forth.

The communication device 800 as described herein can operate with more or less of the circuit components shown in FIG. 8. These variant embodiments can be used in one or more embodiments of the subject disclosure.

The communication device 800 can be adapted to perform the functions of control center 102, the uplink center 104, the services and/or servers or equipment 204, 208, 210, 212 of FIGS. 1-2 and/or server 630 of FIG. 6, the media processor 606, the media devices 608, or the portable communication devices 616 of FIG. 6. It will be appreciated that the communication device 800 can also represent other devices that can operate in one or more of the systems 100, 200 of FIGS. 1 and/or 2, and/or the communication system 600 of FIG. 6, such as a gaming console and/or a media player. In addition, the controller 806 can be adapted in various embodiments to perform the functions 662-666.

Upon reviewing the aforementioned embodiments, it would be evident to an artisan with ordinary skill in the art that said embodiments can be modified, reduced, or enhanced without departing from the scope of the claims described below. For example, the start and stop times for recording are based at least in part on predetermined user preferences, e.g., according to user profile, suggestions by an intelligent system monitoring user behavior, user demographics, user past viewing history and the like. In at least some embodiments, such preferences can be based on a suggestion and/or recommendation, e.g., from a friend. For example, the system can monitor flexible recording activity of others, such as other family member, friends, social media contacts, affinity groups and the like. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 9:
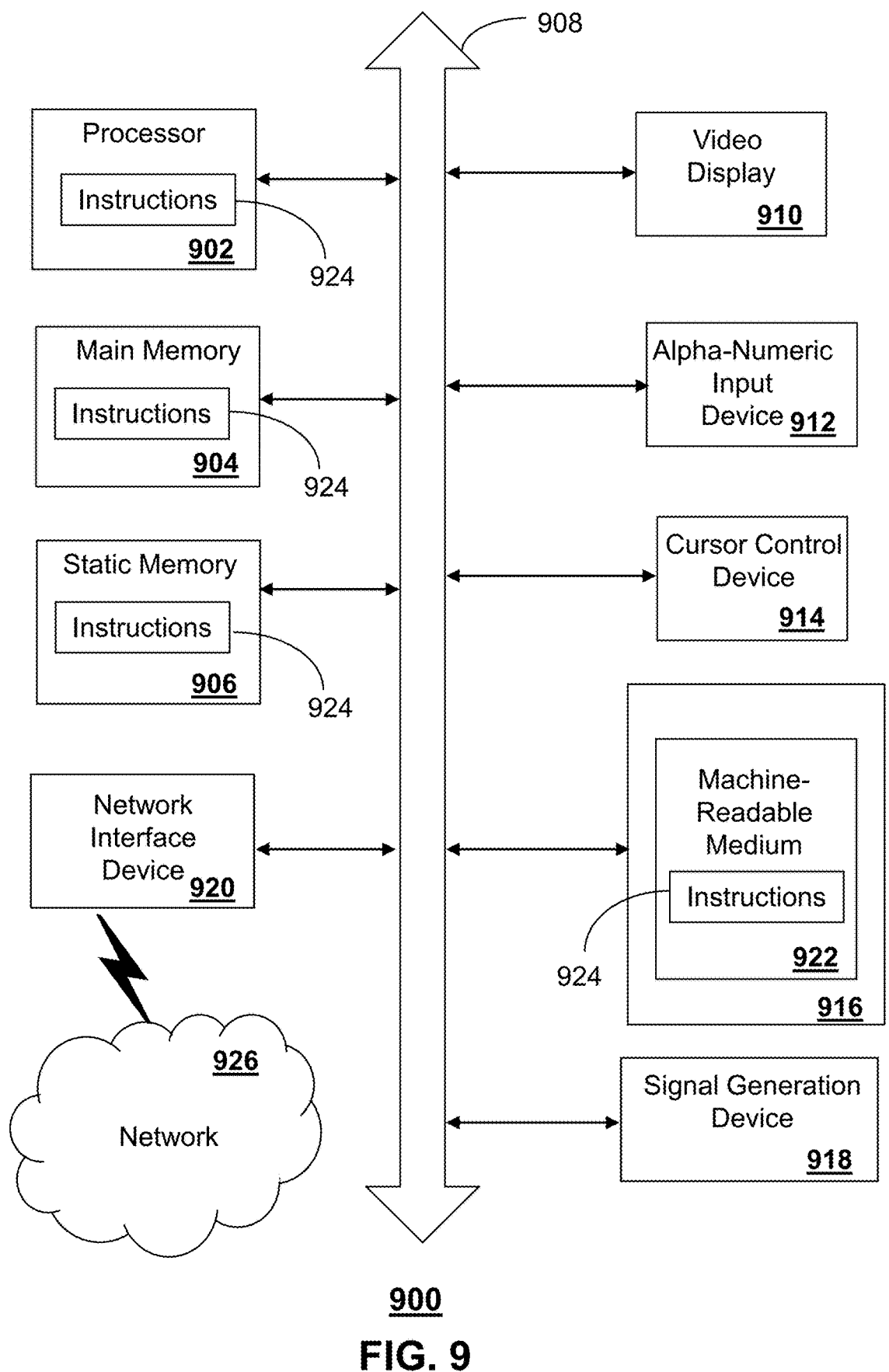
FIG. 9 is a diagrammatic representation of a machine in the form of a computer system within which a set of instructions, when executed, may cause the machine to perform any one or more of the processes described herein.

FIG. 9 depicts an exemplary diagrammatic representation of a machine in the form of a computer system 900 within which a set of instructions, when executed, may cause the machine to perform any one or more of the methods described above. One or more instances of the machine can operate, for example, as the control center 102, the uplink center 104, the subscriber receiving station 110, the display 121, the services and/or servers or equipment 204, 208, 210, 212 and/or the flexible recording server 630, the media processor 606 and other devices of FIGS. 1-3 and 6-8. In some embodiments, the machine may be connected (e.g., using a network 926) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 900 may include a processor (or controller) 902 (e.g., a central processing unit (CPU)), a graphics processing unit (GPU, or both), a main memory 904 and a static memory 906, which communicate with each other via a bus 908. The computer system 900 may further include a display unit 910 (e.g., a liquid crystal display (LCD), a flat panel, or a solid state display). The computer system 900 may include an input device 912 (e.g., a keyboard), a cursor control device 914 (e.g., a mouse), a disk drive unit 916, a signal generation device 918 (e.g., a speaker or remote control) and a network interface device 920. In distributed environments, the embodiments described in the subject disclosure can be adapted to utilize multiple display units 910 controlled by two or more computer systems 900. In this configuration, presentations described by the subject disclosure may in part be shown in a first of the display units 910, while the remaining portion is presented in a second of the display units 910.

The disk drive unit 916 may include a tangible computer-readable storage medium 922 on which is stored one or more sets of instructions (e.g., software 924) embodying any one or more of the methods or functions described herein, including those methods illustrated above. The instructions 924 may also reside, completely or at least partially, within the main memory 904, the static memory 906, and/or within the processor 902 during execution thereof by the computer system 900. The main memory 904 and the processor 902 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 922 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory"

as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 900. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device, comprising:
a processing system including a processor; and a memory that stores executable instructions that, when executed by the processing system, facilitate performance of operations, the operations comprising:
  receiving a first request originating from a media processor for recording a real-time media presentation of a particular live event accessible by way of a direct broadcast satellite service, wherein the first request provides a descriptor associated with the particular live event, and wherein the first request is associated with the media processor of a subscriber of the direct broadcast satellite service;
  identifying an event server responsive to the receiving of the first request;
  submitting to the event server a second request for a list of real-time media presentations of live events currently available by way of a broadcast channel;
  identifying the particular live event within the list of real-time media presentations of live events available by way of the broadcast channel;
  determining whether a recording request to record the particular live event has already been submitted to a head-end conditional access service of the direct broadcast satellite service;
  responsive to determining that the recording request to record the particular live event has not already been sent, submitting a third request to a server to record the particular live event;
  responsive to determining that the recording request to record the particular live event has already been sent:
    resubmitting, periodically, to the event server the second request for the list of real-time media presentations of live events available in the broadcast channel to obtain an updated list of the real-time media presentation of live events currently available by way of the broadcast channel;
    determining, responsive to the particular live event not being within the updated list of the real-time media presentations of live events currently available by way of the broadcast channel, that the real-time media presentation of the particular live event has ended, to obtain a determined end of the real-time media presentation of the particular live event; and
    facilitating a termination of a recording of the real-time media presentation of the particular live event by the media processor of the subscriber, responsive to the determined end of the real-time media presentation of the particular live event.

2. The device of claim 1, wherein a starting time of the particular live event is unknown.

3. The device of claim 2, wherein a broadcast channel carrying the particular live event is unknown, the identifying of the event server if further based on the descriptor associated with the particular live event.

4. The device of claim 3, wherein the resubmitting of the second request for the list of real-time media presentations of live events available in the broadcast channel is repeated according to one of a schedule, a triggering event, or a combination thereof.

5. The device of claim 1, wherein the second request comprises a condition, the operations further comprising:
  determining, according to the resubmitting, periodically, to the event server the second request the particular live event first being within the updated list of the real-time media presentations of live events currently available by way of the broadcast channel, that the real-time media presentation of the particular live event has begun, to obtain a determined beginning of the real-time media presentation of the particular live event; and
  facilitating an initiating of a recording of the real-time media presentation of the particular live event by the media processor of the subscriber, responsive to the determined beginning of the real-time media presentation of the particular live event.

6. The device of claim 1, wherein the facilitating of the termination of the recording of the real-time media presentation of the particular live event, further comprises sending a stop recording command to the media processor of the subscriber.

7. The device of claim 1, wherein the real-time media presentation of the particular live event is recorded contemporaneously by the media processor of the subscriber of the direct broadcast satellite service.

8. A non-transitory, machine-readable storage medium, comprising executable instructions that, when executed by a processing system including a processor, facilitate performance of operations, the operations comprising:
  detecting a first request for recording a real-time media presentation of a particular live event accessible by way of a direct broadcast satellite service, wherein the first request is associated with equipment of a subscriber of the direct broadcast satellite service;
  determining a source of the real-time media presentation of the particular live event;
  submitting to an event server a second request for a list of real-time media presentations of live events according to the source;
  identifying the particular live event within the list of real-time media presentations of live events;
  resubmitting, periodically, to the event server, subsequent requests for an updated list of real-time media presentations of live events to obtain the updated list of real-time media presentations of live events;
  determining, responsive to the particular live event not being within the updated list of real-time media presentations of live events, that the particular live event has ended, to obtain a determined end of the particular live event; and
  facilitating a termination of the recording of the real-time media presentation of the particular live event by the equipment of the subscriber, responsive to the determined end of the particular live event.

9. The non-transitory, machine-readable storage medium of claim 8, wherein the operations further comprise identifying the event server as a source of an activity status of the particular live event.

10. The non-transitory, machine-readable storage medium of claim 8, wherein a broadcast channel carrying the particular live event is unknown, the operations further comprising identifying the broadcast channel carrying the particular live event.

11. The non-transitory, machine-readable storage medium of claim 8, wherein the resubmitting of the subsequent requests are repeated according to one of a schedule, a triggering event, or a combination thereof.

12. The non-transitory, machine-readable storage medium of claim 8, wherein the real-time media presentation of the particular live event is recorded contemporaneously by the equipment of the subscriber of the direct broadcast satellite service.

13. The non-transitory, machine-readable storage medium of claim 8, wherein the facilitating of the termination of the recording of the real-time media presentation of the particular live event, further comprises sending a command to the equipment of the subscriber, wherein the command initiates the termination of the recording.

14. A method, comprising:
   detecting, by a processing system including a processor, a first request for recording a real-time media presentation of a particular live event accessible by way of a direct broadcast satellite service, wherein the first request is associated with equipment of a subscriber of the direct broadcast satellite service;
   determining, by the processing system, a source of the real-time media presentation of the particular live event;
   submitting, by the processing system, a second request to an event server for a list of real-time media presentations of live events according to the source;
   identifying, by the processing system, the particular live event within the list of real-time media presentations of live events;
   resubmitting, by the processing system, to the event server a subsequent request for an updated list of real-time media presentations of live events to obtain the updated list of real-time media presentation of live events;
   determining, by the processing system, responsive to the particular live event not being within the updated list of real-time media presentations of live events, the particular live event has ended, to obtain a determined end of the particular live event; and
   facilitating, by the processing system, a termination of the recording of the real-time media presentation of the particular live event by the equipment of the subscriber, responsive to the determined end of the particular live event.

15. The method of claim 14, further comprising identifying Hall the source of the of the real-time media presentation of the particular live event.

16. The method of claim 15, wherein a broadcast channel carrying the particular live event is unknown, the method further comprising identifying, by the processing system, the broadcast channel carrying the particular live event.

17. The method of claim 16, wherein the resubmitting of the subsequent request is repeated according to one of a schedule, a triggering event, or a combination thereof.

18. The method of claim 14, wherein the first request comprises a condition, the method further comprising:
   determining, by the processing system, according to the identifying the particular live event within the list of real-time media presentations of live events, whether the real-time media presentation of the particular live event has begun, to obtain a determined beginning of the real-time media presentation of the particular live event; and
   facilitating, by the processing system, a initiating of a recording of the real-time media presentation of the live event by the equipment of the subscriber, responsive to the determined beginning of the real-time media presentation of the live event.

19. The method of claim 14, wherein the facilitating of the termination of the recording of the real-time media presentation of the particular live event, further comprises sending a command to the equipment of the subscriber, wherein the command initiates the termination of the recording.

20. The method of claim 14, wherein the real-time media presentation of the particular live event is recorded contemporaneously by the equipment of the subscriber of the direct broadcast satellite service.

* * * * *